United States Patent [19]

Pinard et al.

[11] 4,084,907

[45] Apr. 18, 1978

[54] METHOD AND APPARATUS FOR DETERMINING THE WAVE NUMBER OF OPTICAL SPECTRUM RADIATION

[75] Inventors: Jacques Andre Pinard, Buc; Patrick Pierre Paul Juncar, Evry, both of France

[73] Assignee: Agence Nationale de Valorisation de la Recherche (ANVAR), France

[21] Appl. No.: 630,028

[22] Filed: Nov. 7, 1975

[30] Foreign Application Priority Data

Nov. 14, 1974 France ............................... 74 37583

[51] Int. Cl.$^2$ ............................................. G01B 9/02

[52] U.S. Cl. ................................ 356/106 S; 250/550

[58] Field of Search ........................ 356/106 S, 106 R; 250/550

[56] References Cited

U.S. PATENT DOCUMENTS

| | | | |
|---|---|---|---|
| 2,604,004 | 7/1952 | Root | 356/106 R |
| 3,271,676 | 9/1966 | Chitayat | 356/106 R |
| 3,409,375 | 11/1968 | Hubbard | 356/106 R |
| 3,601,491 | 8/1971 | Smith-Vaniz | 356/106 R |

OTHER PUBLICATIONS

White et al., *Fundamentals of Optics*, McGraw-Hill, 1957, (third edition) p. 282.

*Primary Examiner*—Conrad J. Clark
*Attorney, Agent, or Firm*—Berman, Aisenberg & Platt

[57] ABSTRACT

Method and apparatus for determining the wave number of optical spectrum radiation, particularly for use in controlling lasers. Two parts of a beam provided by a source to be monitored, particularly a laser, are directed to two double-wave interferometers. The differences of the optical path lengths $\delta$ of the interferometers are assigned a difference of $\lambda/4$ which corresponds to a phase difference of $\pi/2$. The two optical output signals emerging from the interferometers are converted into sinusoidal electrical waves in quadrature as a function of the wave number $\sigma = 1/\lambda$ of the laser and the period $1/\delta$ of the two sinusoidal electrical waves. The electrical waves are processed in suitable circuitry to obtain a modulo value $1/\delta$ of the wave number. These steps are repeated for different values of $\delta$ so as to progressively eliminate uncertainty in the value of the wave number.

14 Claims, 17 Drawing Figures

METHOD AND APPARATUS FOR DETERMINING THE WAVE NUMBER OF OPTICAL SPECTRUM RADIATION

BACKGROUND OF THE INVENTION

FIELD OF THE INVENTION

The present invention relates to very precise determinations of the order of $10^{-8}$ in relative terms, of the wave number of optical spectrum radiation.

DESCRIPTION OF THE PRIOR ART

Devices permitting the determination of the wavelength of optical spectrum radiation are already known.

Spectrometers with gratings permit absolute measurement of wavelengths with an accuracy of $10^{-5}$, i.e. to the nearest tenth of an Angstrom, after calibration.

Perot-Fabry interferometers make it possible to obtain greater precision, but only for measuring separations between two neighboring frequencies and not for absolute frequency measurements.

The use of the Michelson interferometer makes it possible to provide a commercial apparatus in which fringes are counted when the optical path length difference is varied by moving one of the mirrors, with the wavelength $\lambda$ to be measured and simultaneously with the reference wavelength $\lambda_r$; the number of fringes $k$ and $k_r$ corresponding to the wavelengths $\lambda$ and $\lambda_r$ are then counted separately. We then have the expression $\lambda = \lambda_r (k_r/K)$. Such an apparatus gives measurements whose accuracy is of the order of one Angstrom; this accuracy can be increased by using an interferometer in which the optical path length difference is adjustable in wide proportions. Nevertheless such a method is not capable of giving a frequency measurement in a short period of time, the displacement of the mirror being a delicate operation, time -consuming and requiring numerous precautions.

OBJECTS AND SUMMARY OF THE INVENTION

An object of the present invention is to measure the wave number with great precision, at least of the order of $10^{-8}$, in real time, which is of particular interest in the case of pulsed lasers.

The foregoing and other objects are attained in accordance with one aspect of the invention through the provision of a method of determining the wave number of optical spectrum radiation comprising the steps of directing two parts of a beam from a source to be monitored to two double wave interferometers, setting the optical path length differences of the interferometers to a difference of $\lambda/4$ corresponding to a phase shift of $\pi/2$, converting two optical output signals from the two interferometers into electrical sinusoidal waves in quadrature as a function of the wave number $\sigma = 1/\lambda$ and the period $1/\delta$, processing the two electrical sinusoidal waves so as to obtan a modulo value $1/\delta$ of the wave number, and repeating the preceding steps for different values of $\delta$ in order to come progressively closer to eliminating uncertainty in the value of the wave number.

In order to obtain the two parts of the beam a spatial division of the beam may be carried out or two right-angle polarized components of the same beam may be provided.

Preferably, the two sinusoidal waves are divided by an electrical signal proportional to the intensity of the source of optical spectrum radiation, and the constant "1" is subtracted so as to obtain two sine and cosine waves in quadrature, the last-mentioned waves being supplied to the inputs X and Y of an oscilloscope or processed so as to provide a measurement of frequency control, for example of a laser, depending on the desired application.

The present invention is also concerned with various apparatus for carrying out the method according to the invention.

BRIEF DESCRIPTION OF THE DRAWINGS

There will now be described hereinafter the operating principle and non limiting examples of the present invention, with reference to the accompanying drawings, in which.

Figure 2:
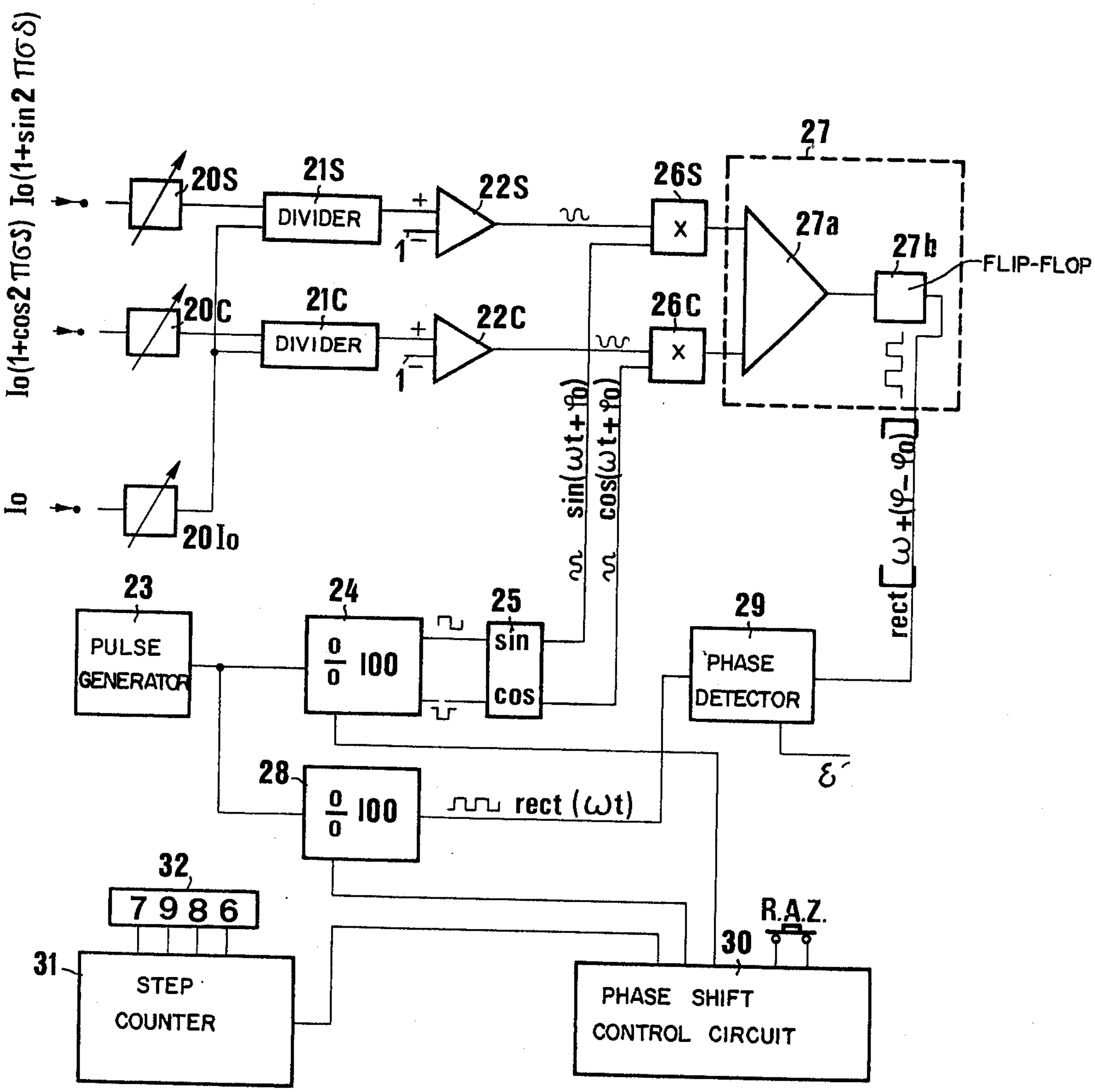
FIG. 2 is circuit diagram for processing output signals from the interferometer of FIG. 1 for use in controlling the frequency of a laser.
Figure 3:
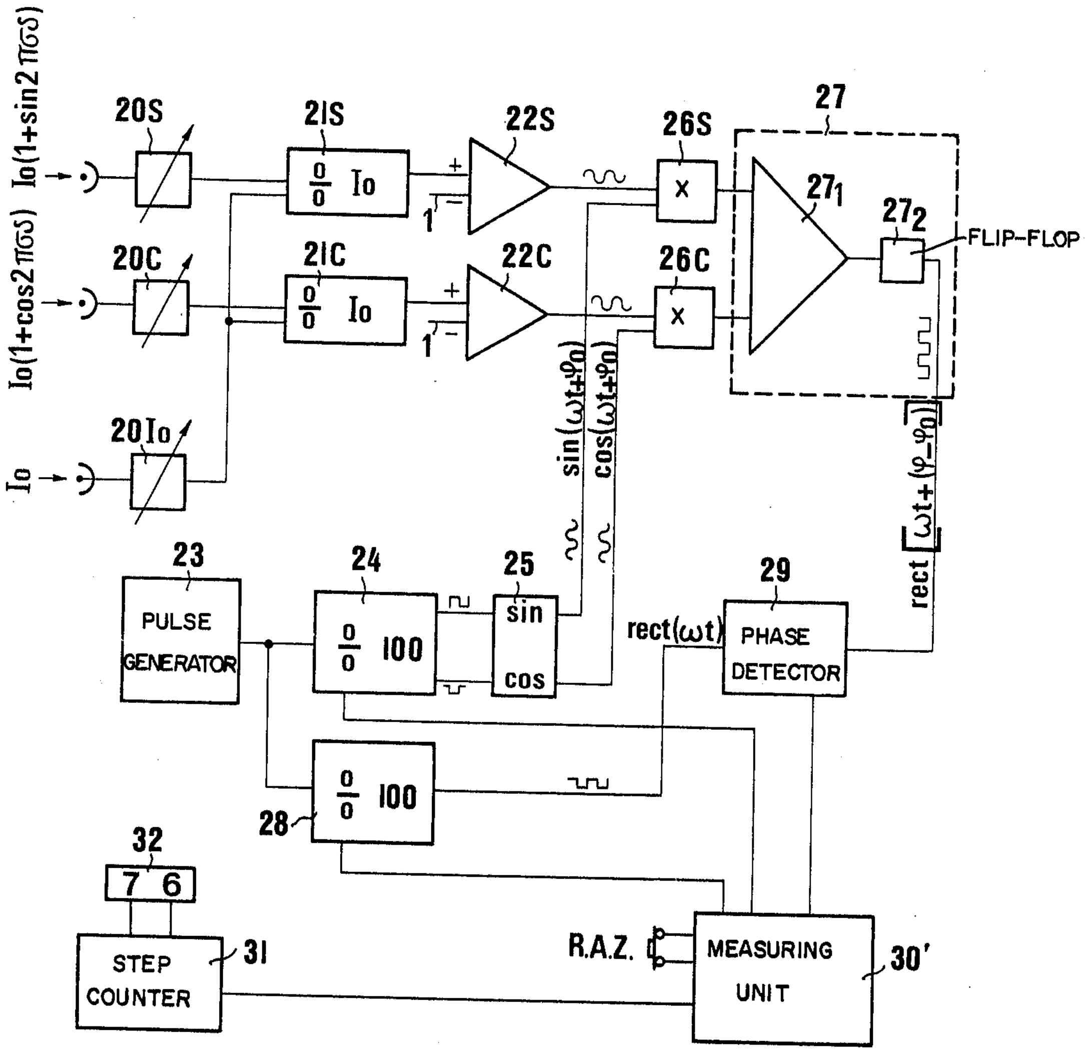
FIG. 3 is a circuit diagram for processing electrical waves provided by the interferometer in FIG. 1 for use in measuring the frequency of a laser.
Figure 7:
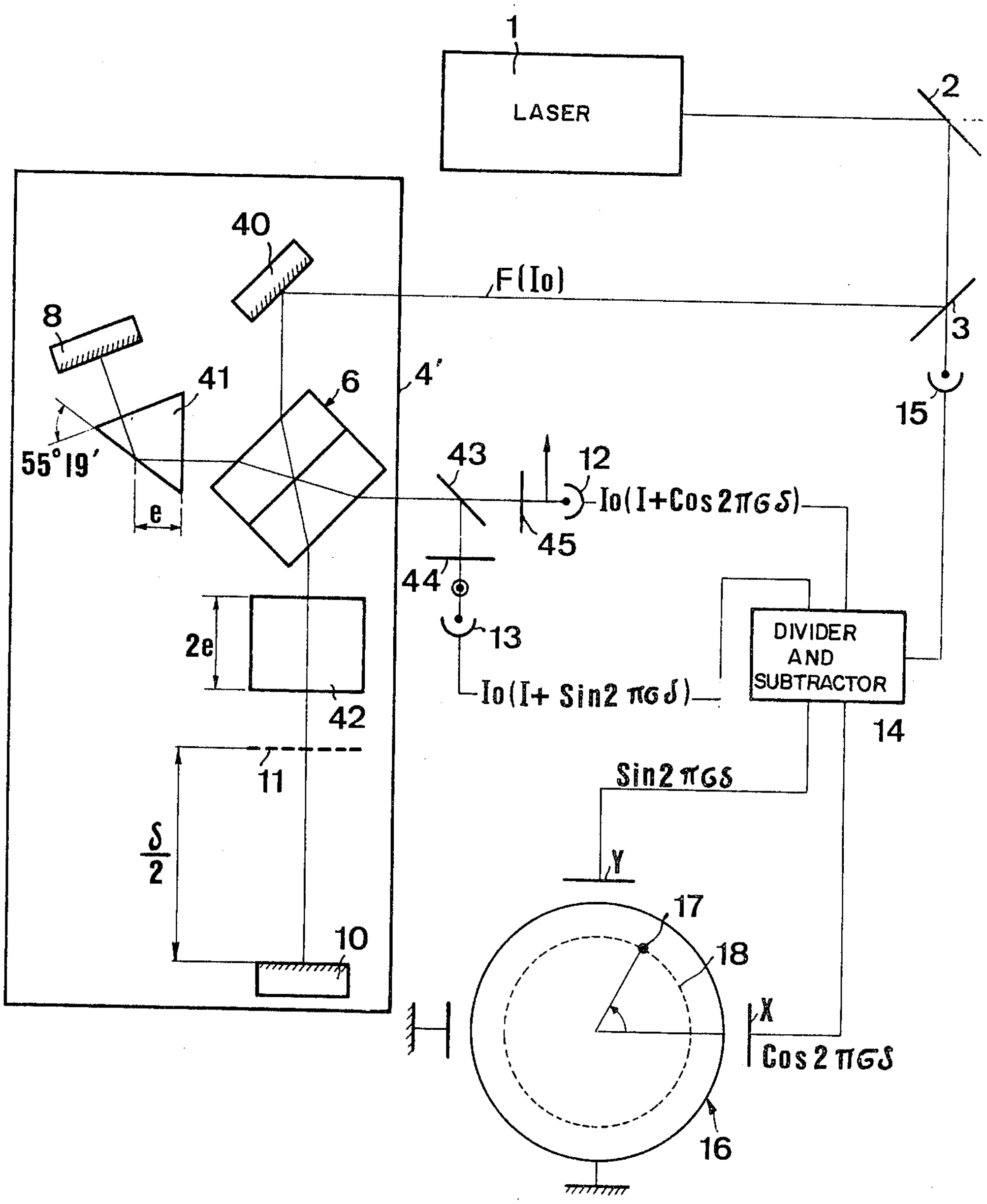

FIGS. *4a, 4b, 4c, 4d* and *4e* illustrate various waveforms at different points in the circuit in FIG. 2;

FIGS. *5a, 5b, 5c* and *5d* show the configuration of waveforms at different points in the circuits of FIGS. 2 and 3;

FIGS. *6a, 6b, 6c* and *6d* show the display of a particular value of the number of waves for various optical path length differences;

FIG. 7 schematically illustrates another embodiment of the apparatus according to the invention.

DETAILED DESCRIPTION OF THE PREFERRED EMBODIMENTS

Figure 1:
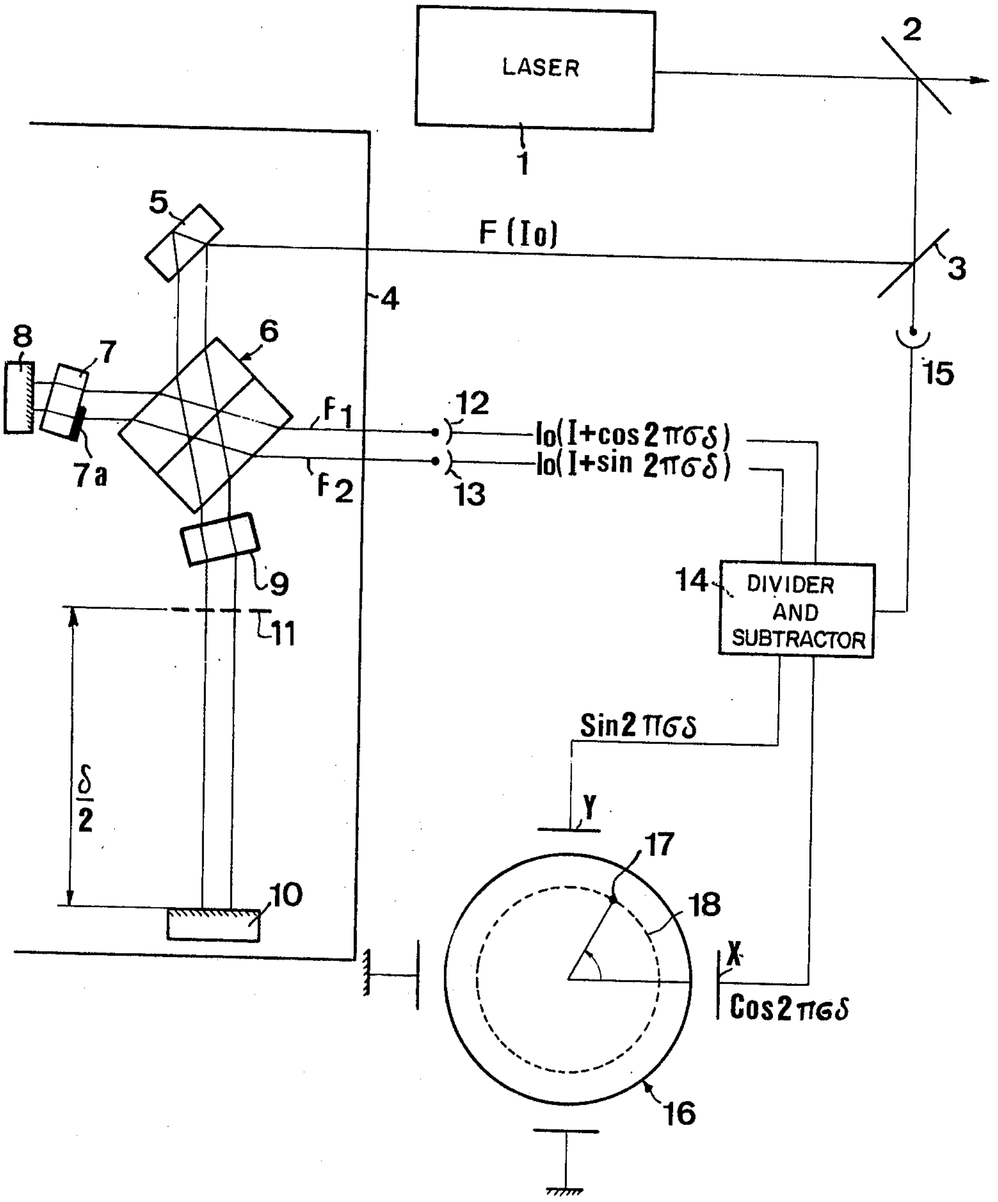
FIG. 1 is a diagrammatic view of a first embodiment of an apparatus according to the invention.

FIG. 1 illustrates the operating principle of the method according to the invention. In this figure a laser 1 having a variable wavelength is shown diagrammatically.

Part of the beam emitted by the laser 1 is divided by a first beam splitter 2 then by a second beam splitter, on its way to a double interferometer 4.

The interferometer 4 is a Michelson type interferometer and comprises a fixed plane-parallel transparent plate beam splitter 5, serving to split the incident beam F, having an intensity Io, into two parallel beams and causing them to fall onto a combined beam splitter and compensator 6 including a fixed double plane-parallel transparent plate.

One of the arms of the interferometer has a plane-parallel transparent plate 7 which acts as a support for a phase shifting coating *7a* which is formed by vacuum deposition or evaporation and disposed along the optical path of one of the two split beams coming from the double plane-parallel plate 6. The coating *7a* has as its function the introduction of an additional optical path length difference $\Delta\delta$ equal to $\lambda/4$ between the differences of path lengths $\delta$ of the double interferometer 4. The plane-parallel transparent plate 7 is mounted at an angle which is adjustable so as to obtain the desired value of $\Delta\delta$, the plane-parallel plate 7 remaining fixed during measuring operations. The plane-parallel plate 7 is associated with a fixed mirror 8. The other arm of the interferometer 4 comprises a fixed plane-parallel transparent plate 9 which is identical to the plane-parallel transparent plate 7 and is likewise mounted at an angle and adapted to compensate for the plane-parallel plate 7. The plane-parallel transparent plate 9 is associated with a fixed mirror 10 located at a distance of $\delta/2$ from the image 11 (through the double plane-parallel plate 6) of the mirror.

At the output of the interferometer 4 there are two parallel beams f1 and f2 which are out of phase by $\pi/2$ and are directed to photomultipliers 12 and 13 connected to a divider and subtractor circuit 14.

Circuit 14 is connected to another photomultiplier 15 which receives part of the beam which has passed through the second beam splitter 3.

The output of circuit 14 is connected to inputs X and Y of an oscilloscope 16.

The apparatus which has just been described operates as follows:

For an angle of inclination of the plane-parallel transparent plate 7 corresponding to an additional optical path difference $\Delta\delta$ equal to $\lambda/4$ between the two parts $f_1$ and $f_2$ of the beam, the intensities of illumination at the ouput of the interferometer 4 are equal to Io(1 + cos 2 $\pi\sigma\delta$) and Io(1 + sin 2 $\pi\sigma\delta$), where Io is the intensity of the beam F, and $\sigma$ (the wave number) is equal to $1/\lambda$, $\lambda$ being the wavelength of the laser.

These intensities of illumination are converted into sinusoidal electrical waves by the photomultipliers 12 and 13.

In circuit 14 the electrical waves corresponding to Io (1 + cos 2 $\pi\sigma\delta$) and Io(1 = sin 2 $\pi\sigma\delta$) are divided by the output electrical signal from the photomultiplier 15 which corresponds to an intensity of illumination proportional to Io thereby making the measurement independent of variations in the intensity of the laser.

Thereafter it suffices to subtract the constant "1" so as to obtain a circuit 14 output comprising two waves (sin 2 $\pi\sigma\delta$ and cos 2 $\pi\sigma\delta$) which are in quadrature.

The last-mentioned sine and cosine waves are fed to input terminals X and Y of the oscilloscope 16 and shown on the screen thereof, the spot 17 of the oscilloscope 16 describing a complete circle 18 when the wave number $\sigma$ of the laser radiation varies $1/\delta$. The position of the spot 17 on the circle thus provides a measurement of $\sigma$ modulo $1/\delta$ In order to eliminate the uncertainty $k/\delta$ in the measurement of the wave number, a plurality of double interferometers are used, all of the same type but having optical path length differences $\delta_1, \delta_2, \delta_3 \ldots \delta_m$ according to a geometric progression (e.g. $\delta_1 = 10$, $\delta_2 = 100$, $\delta_3 = 1000$ etc. . .) which allows the value of $\sigma$ modulo $1/\delta_m$ to be obtained, the free spectral interval corresponding to the interferometer having the smallest optical path length difference.

If we take the case (FIGS. *6a, 6b, 6c* and *6d*) of four interferometers having optical path length differences $\delta_1 = 50$ cm, $\delta_2 = 5$ cm, $\delta_3 = 5$ mm and $\delta_4 = 0.5$ mm, on each of the viewing screens one revolution of the spot corresponds to 20 mk, 200 mk, 2 $cm^{-1}$, and 20 $cm^{-1}$ (mk $= 10^{-3}$ $cm^{-1}$ = 30 MHz).

In this manner it is possible to come progressively closer to eliminating the uncertainty in the value of $\sigma$.

In the above example the frequency of the laser must be known to the nearest 20 $cm^{-1}$ by means of a low resolution spectrometer. The greatest precision will be given by the first interferometer ($\delta_1 = 50$ cm). It will be readily appreciated that one hundredth of a revolution is 0.2 mk (or 6 MHz) which yields an absolute uncertainty of the relative measurement of the wave number $\sigma$ of the order of $10^{-8}$. It should be noted that the precision of course depends on the accuracy to which the value of $\delta_1$ is known.

Instead of simultaneously using a plurality of apparatus identical to that of FIG. 1, it is of course possible to use only one, the different measurements, obtained by displacing one of the mirrors 8 or 10, being determined sequentially and stored in a memory.

There will now be described with reference to FIG. 2 the application of the method according to the invention to controlling the frequency of a laser.

Accordingly, the signals provided by the photomultipliers 12 and 13 of the apparatus in FIG. 1 are processed electronically in the circuitry shown schematically in the block diagram in FIG. 2.

The electrical signals Io (1 + cos 2 $\pi\sigma\delta$) and Io(1 + sin 2 $\pi\sigma\delta$) are supplied to two pre-calibrated variable gain amplifiers 20S and 20C the outputs of which are connected to two analog dividers 21S and 21C also receiving a signal from a third variable gain amplifier 20 Io connected to the third photomultiplier 15.

The outputs of the dividers 21S and 21C are connected to operational amplifiers 22S and 22C which are in turn connected to multipliers 26S and 26C. The multipliers 26S and 26C also receive signals from a digital divide-by-a hundred divider 24 after being filtered in a double filter 25, the divider 24 being supplied by a pulse generator 23 which is a 10 MHz frequency oscillator.

The multipliers 26S and 26C are connected to an adder and shaper circuit 27 comprising an operational amplifier *27a* and a flip flop *27b*.

The output of circuit 27 is connected to a phase detection circuit 29 which also receives another signal coming from a divide-by-a-hundred digital divider 28.

The digital dividers 24 and 28 are connected to a phase shifting control circuit 30. The circuitry finally comprises a viewing circuit including a step counter 31 and a display device 32.

The operation of the circuitry shown in FIG. 2 is as follows.

The electrical waves corresponding to Io(1 = sin 2 $\pi\sigma\delta$) and Io(1 + cos 2 $\pi\sigma\delta$) and to Io are fed to amplifiers 20S, 20C and 20 Io, respectively.

The division by Io operation is carried out by the analog dividers 21S and 21C, and the centering of the sine waves on the axis (between −1 and + 1) is effected by the operational amplifiers 22S and 22C. The output signal of the operational amplifiers 22S and 22C is supplied to the multipliers 26S and 26C where they are multiplied by the signals sin ($\omega$ t + $\phi_o$) and cos ($\omega$ t + $\phi_o$) respectively; the generation of these signals will now be described. The 10 MHz frequency oscillator pulses are carried to the divide-by-a-hundred digital divider 24 which provides rectangular output signals in quadrature which after filtering in a double filter 25 provides waves sin ($\omega$ t + $\phi_o$) and cos ($\omega$ t + $\phi_o$) which are then fed into the multipliers 26S and 26C. The manner in which the phase $\phi_o$ is varied will be indicated hereinafter.

Signals sin ($\omega$ t + $\phi_o$) and cos ($\omega$ t + $\phi_o$) are then added and shaped in circuit 27, i.e., added in the operational amplifier *27a* thereby providing an output signal cos [$\omega$ t + ($\phi$ + $\phi_o$)] which is transformed into a rectangular signal (FIG. *4a*) of the same frequency rect [$\omega$ t + ($\phi$ − $\phi_o$)] by the flip-flop *27b*, the rectangular signal being fed to the phase detection circuit 29.

Figure 4:
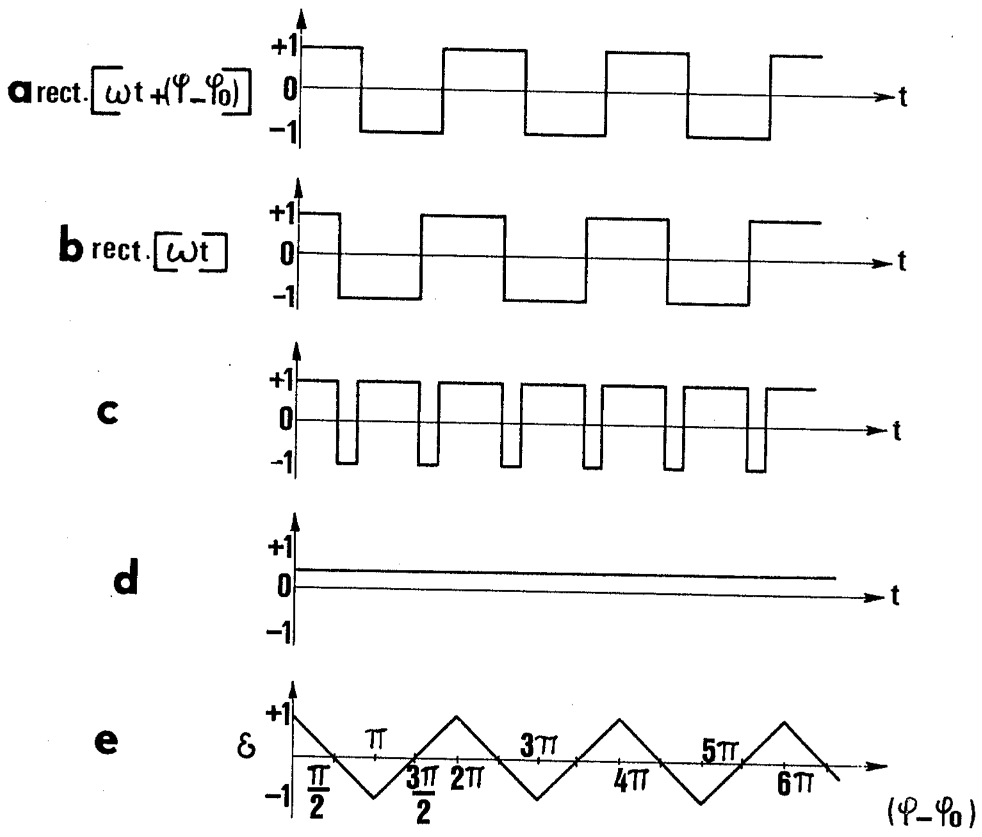

For carrying out phase detection, a reference signal rect [$\omega$ t] (see FIG. *4b*) must be introduced into circuit 29. Accordingly, the pulses from oscillator 23 are also introduced into the divide-by-a-hundred digital divider 28 which provides directly an output signal rect $\omega t$. In the phase detection circuit 29, two signals rect $[\omega t + (\phi - \phi_o)]$ and rect $\omega t$ are multiplied together (FIG. 4a) then filtered (FIG. 4d). An output signal is then obtained (see FIG. 4e) which is the error signal $\epsilon$ shown in FIG. 2 and which is proportional to $-(\phi - \phi_o)$ when $O<\phi - \phi_o < \pi$ and directly proportional to $(\phi - \phi_o)$ when $\pi<\phi-\phi_o<2\pi$.

The output signal of the phase detection circuit 29 is called the error signal B because it serves in fact as an actuating signal for the frequency of the laser 1. To illustrate this point we shall now describe how to vary the phase $\phi_o$.

Figure 5:
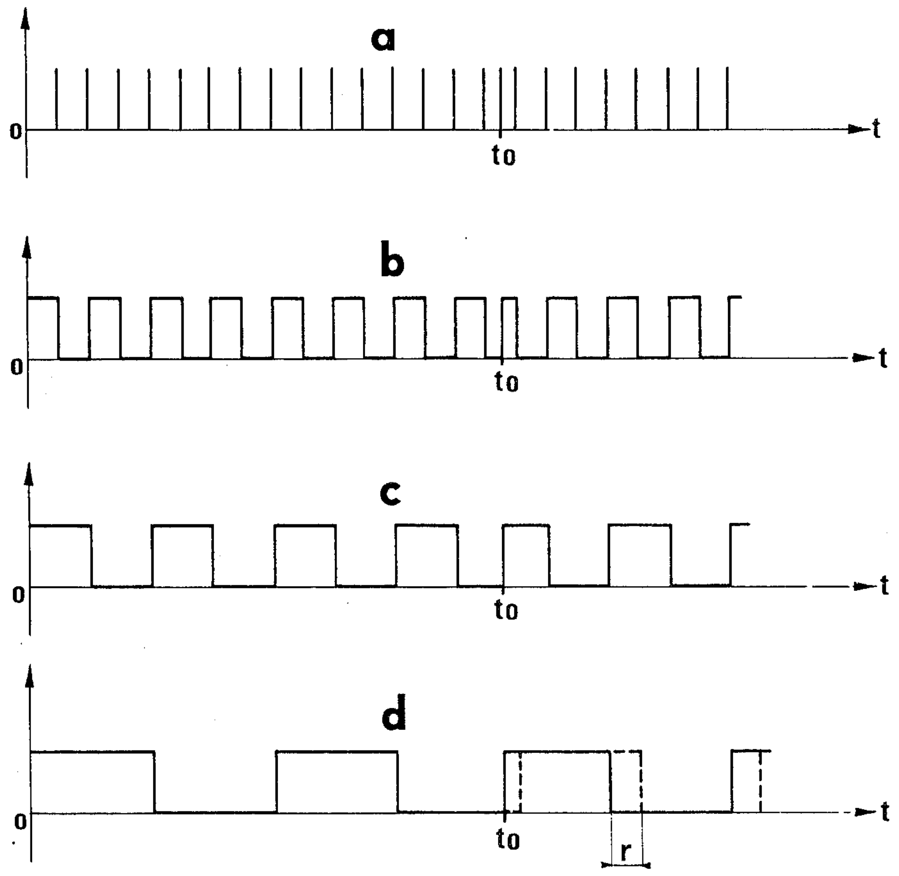
Figure 6:
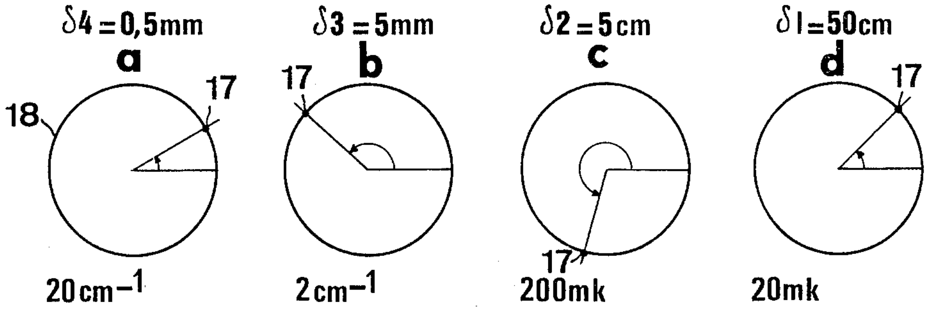

The phase shift control circuit 30 provides additional pulses which are variable, manually or automatically, in number and speed at the input to divider 24 or 28. For example, let us assume that we introduce one additional pulse into the train of pulses entering the digital divider 24. Since the switching of a rectangular output signal is triggered after a predetermined number of pulses, to be exact, 50 pulses, the rectangular signal will have its phase angle advanced by one hundredth of a period. This procedure is illustrated by FIGS. 5a through 5d for a case of division by eight when an additional pulse is added at time $t_o$. In FIG. 5d the retardation $r$ of the phase by 1:8 of the period at time $t_o$ is indicated.

For each additional pulse at the input of divider 24 the phase angle $\phi_o$ advances $2\pi/100$. If the pulses at the input of the digital divider 28 are introduced in the same manner, the phase angle $\phi_o$ will vary relative to the reference signal in the opposite direction $2\pi/100$.

If the error signal $\epsilon$ is used to control the laser, we make $\phi$ equal $\phi_o$ and for 100 input pulses to circuit 30 the wave number of the laser will vary $1/\delta$.

The step counter 31 and the display device 32 permit the viewing and storage of the operation of the phase shift control circuit 30. The phase shift control circuit 30 further comprises a resetting device (RAZ).

In case of a single control system for the frequency of the laser, a single, double interferometer and a single circuitry arrangement, as shown in FIG. 2, may be used.

FIG. 3 is a block diagram similar to that shown in FIG. 2 and adapted to measure the frequency of the laser 1, for example. The phase shift control circuit 30 is replaced by a measuring unit 30' which includes a frequency converter which transforms the output signal from the phase detection circuit 29 to a frequency proportional thereto. In this case it is desirable to process the signal $f(\phi - \phi_o)$ so that it is proportional to $\phi - \phi_o$ for values between 0 and $2\pi$.

The signal provided by the frequency converter is fed to the digital divider 24 in case of a leading phase angle or to the digital divider 28 in case of lagging phase angle. In this way a real internal feedback network is provided and the phase angle $\phi_o$ varies constantly with the phase angle $\phi$.

By counting the number of pulses triggered after a phase resetting of the rect $(\omega t + \phi_o)$ and rect $(\omega t)$ signals we have the whole multiple portion of $2\pi/100$ of phase angle $\phi$. The internal feedback network thereby provides a continuous control of the value of the phase angle proportional to the frequency of the laser 1.

By processing all the signals received by different interferometers in the same way, values of different phases are obtained which when analyzed by a small computer will provide the value of the wave number of the laser radiation.

In case of the circuitry of FIG. 2, a plurality of electronic circuitry setups identical to that which is shown is required, or a single such setup on the condition that the data furnished by the interferometer may be stored in a memory.

FIG. 7 illustrates a modified embodiment of the optical apparatus according to the invention. In FIG. 7 identical or analogous elements bear the same reference numerals as in the embodiment of FIG. 1.

In this modified embodiment instead of splitting the beam into two separate parallel parts inside the interferometer as in the case of the embodiment of FIG. 1, we perform the method on two right-angle polarized components so that the emerging beam F comprises two superimposed beams at right angles with a $\pi/2$ phase difference. For this purpose, the beam F is reflected off a mirror 40 towards the double plane-parallel transparent plate 6. One of the arms of the interferometer 4' includes a total reflecting prism 41 and the mirror 8, the other arm including the mirror 10 and a plane-parallel transparent compensating element 42. At the output of the interferometer the two right-angle polarized components with a $\pi/2$ phase difference are separated by a beam splitter (plane-parallel plate) 43 and crossed analyzers 44 and 45.

Such a modified embodiment allows the problems posed by the use of phase shifting plate by transmission (e.g. FIG. 1) to be overcome.

The use of a total reflecting prism and the phase difference between the different polarized components of the reflected beam renders the system achromatic for a very wide spectral range. Indeed, for a carefully chosen orientation of the prism 41, the phase difference is dependent on only the index of refraction of the medium; by selecting a very low scattering glass, a phase difference between the two polarized components of the reflected beam is practically constant as a function of $\pi$.

The phase difference is given by the formula:

$$\tan\frac{\pi - \phi}{2} = \frac{\sin^2 i}{\cos i\sqrt{\sin^2 i - \frac{I}{n^2}}}$$

For $\phi = \pi/4$ ($\pi/2$ back and forth) and taking a typical index of refraction $n = 1.52$, the angle of incidence $i$ must be equal to 55°21'. The prism 41 is then produced with a vertex angle of 69°21' so as to allow the beam to strike perpendicular to the lateral sides thereby minimizing the variations of $\phi$ as a function of the angle of incidence thereby making adjustments more flexible.

A further advantage of the method is that it uses only one beam traversing the interferometer 4' which eliminates random phase differences between the optical paths (FIG. 1) due to a poor adjustment of the mirror 8, such random phase differences causing the deformation of the circles on the various display screens.

Finally, the invention is obviously not limited to the embodiments shown and described hereinabove but on the contrary includes all modifications within the scope of the appended claims.

What we claimed is:

1. A method of determining the wave number of optical spectrum radiation of a beam provided by a source of radiation to be monitored including directing two parts of said beam to two double-wave interferometers, comprising the steps of assigning optical path length differences $\delta$ of said interferometers a difference value of $\lambda/4$ which corresponds to a phase difference of $\pi/2$, converting two output optical signals emerging from said interferometers into electrical sinusoidal signals in quadrature as a function of the wave number $\sigma = 1/\lambda$ of said source of radiation and $\delta$, processing the two sinusoidal signals so as to obtain a modulo value $1/\delta$ of the wave number, and repeating the aforesaid steps for different values of $\delta$ in order to come progressively closer to eliminating uncertainty in the value of the wave number.

2. A method according to claim 1, wherein the two parts of said beam are provided by spatially dividing said beam into two parallel parts.

3. A method according to claim 1, wherein the two parts of said beam are provided by two right-angle polarized components of said beam.

4. A method according to claim 1, wherein the processing of the two electrical sinusoidal waves further comprises dividing said two electrical sinusoidal waves by a signal proportional to the intensity of illumination of said source of radiation and subtracting the constant "1" to obtain first sine and cosine electrical waves in quadrature.

5. A method according to claim 4, further comprising feeding the first sine and cosine waves to input terminals of an oscilloscope screen to obtain a revolving spot, the position of the spot on its circle of revolution being an indication of $\sigma$ modulo $1/\delta$.

6. A method according to claim 4, for use in obtaining a continuous measurement of the frequency of said source of radiation which is a laser, further comprising the steps of providing second sine and cosine waves having the same phase difference, multiplying the first sine and cosine waves by second sine and cosine waves respectively, adding the products of multiplication of said sine and cosine waves, converting the sum of the products of multiplication into a rectangular waveform, detecting the phase difference of the rectangular waveform with a reference signal to obtain a signal strictly proportional to the phase difference between said first and second waves, using the strictly proportional signal to make the phase difference of said second waves to depend constantly on that of said first waves and to determine the value of the phase difference of said first waves which is proportional to the frequency of said laser, and carrying out the aforesaid steps simultaneously for different values of $\delta$ to eliminate uncertainty in the measurement of the frequency of said laser.

7. A method according to claim 6, providing measurements of the wave number with an optical path length differences $\delta$ in geometric progression.

8. A method according to claim 4, for use in controlling the frequency of said source of radiation which is a laser, further comprising the steps of providing second sine and cosine waves having the same phase difference, multiplying said first sine and cosine waves by said second sine and cosine waves respectively, adding the products of multiplication of said sine and cosine waves, converting the sum of the products of multiplication into a rectangular waveform, detecting the phase difference of the rectangular waveform with a reference signal to obtain a signal strictly proportional to the phase difference between said first and second waves, using said strictly proportional signal for controlling the frequency of said laser while maintaining the phase of the first waves proportional to the frequency of said laser constantly equal to the phase difference of said second waves.

9. Apparatus for determining the wave number of optical spectrum radiation comprising a source of optical spectrum radiation providing a beam, a double Michelson interferometer including a plane-parallel transparent plate receiving part of said beam and directing two parallel beams to a combined beam splitter and compensator, including a double (plane-parallel) transparent plate, said interferometer having an arm including another plane-parallel transparent plate supporting a thin phase shifting coating disposed along the optical path of one of said two parallel beams and a fixed mirror, and another arm of said interferometer including a compensating plane-parallel transparent plate and a fixed mirror mounted at a distance from the image of the mirror in the first arm of the interferometer of $\delta/2$, the plane parallel plate supporting said phase shifting coating being disposed at an adjustable angle to introduce an additional optical path length difference $\Delta\delta$ equal to $\lambda/4$ between said two parallel beams, two detectors arranged along the paths of said two beams, a third detector receiving another part of said beam from said source of radiation, a divider and subtractor circuit connected to output terminals of the two detectors and the third detector, and a display device connected to said divider and subtractor circuit.

10. An apparatus according to claim 9, wherein output terminals of said divider and subtractor circuit are connected to multiplier circuits which are in turn connected to an adder and shaper circuit, the adder and shaper circuit being connected to a phase detection circuit which in turn is connected to a frequency converter, the frequency converter being connected to two dividers which are supplied by pulses from a pulse generator, one of said dividers being connected to the multiplier circuits through a double filter, and a display device being provided for viewing indications from said phase detection circuit.

11. An apparatus according to claim 9, wherein the outputs of the divider and subtractor circuit are connected to multiplier circuits which are in turn connected to an adder and shaper circuit, the adder and shaper circuit being connected to a phase detection circuit which in turn is connected to a phase shift control circuit connected to two dividers, a pulse generator, supplying pulses to said two dividers, said phase detection circuit being connected to means for controlling the frequency of said source which is a laser, and said phase shift control circuit providing additional phase shift pulses to said two dividers.

12. An apparatus for determining the wave number of optical spectrum radiation from a source of optical spectrum radiation providing a beam, comprising an interferometer with polarizing means, said interferometer including a fixed mirror for directing part of said beam to a combined beam splitter and compensator including a double (plane-parallel) transparent plate, said interferometer having one arm including a mirror and a total reflecting prism, and another arm including a compensating plane-parallel transparent plate mounted at a distance of $\delta/2$ from the image of the mirror in the first arm of said interferometer, the prism being arranged at an angle to obtain a phase difference of $\pi/2$ between two right angle polarized components emerging from said interferometer, a beam splitter disposed to receive the optical output of said interferometer, an analyzer disposed in the path of each of the two split beams emerging from said beam splitter, so as to select the two right angle polarized components, a detector arranged following each said analyzer and a third detector receiving another part of said beam from said source of radiation, a divider and subtractor circuit connected to the output of the first two and the third detectors, and a display device connected to said divider and subtractor circuit.

13. An apparatus according to claim 12, wherein output terminals of said divider and subtractor circuit are connected to multiplier circuits which are in turn connected to an adder and shaper circuit, the adder and shaper circuit being connected to a phase detection circuit which in turn is connected to a frequency converter, the frequency converter being connected to two dividers which are supplied by pulses from a pulse generator, one of said dividers being connected to the multiplier circuits through a double filter, and a display device being provided for viewing indications from said phase detection circuit.

14. An apparatus according to claim 12 wherein the outputs of the divider and subtractor circuit are connected to multiplier circuits which are in turn connected to an adder and shaper circuit, the adder and shaper circuit being connected to a phase detection circuit which in turn is connected to a phase shift control circuit connected to two dividers, a pulse generator, supplying pulses to said two dividers, said phase detection circuit being connected to means for controlling the frequency of said source which is a laser, and said phase shift control circuit providing additional phase shift pulses to said two dividers.

* * * * *